(12) United States Patent
Hara et al.

(10) Patent No.: US 6,820,738 B2
(45) Date of Patent: Nov. 23, 2004

(54) INTERMEDIATE TRANSFER MEMBER AND IMAGE FORMING APPARATUS HAVING THE SAME

(75) Inventors: Yukio Hara, Minamiashigara (JP); Masao Nakamura, Fukaya (JP); Toshihiko Tomita, Okegawa (JP)

(73) Assignees: Fuji Xerox Co., Ltd., Tokyo (JP); Nitto Denko Corporation, Osaka (JP)

( * ) Notice: Subject to any disclaimer, the term of this patent is extended or adjusted under 35 U.S.C. 154(b) by 0 days.

(21) Appl. No.: 10/338,824

(22) Filed: Jan. 9, 2003

(65) Prior Publication Data

US 2003/0119968 A1 Jun. 26, 2003

Related U.S. Application Data

(62) Division of application No. 09/721,951, filed on Nov. 27, 2000, now Pat. No. 6,646,040.

(30) Foreign Application Priority Data

May 15, 2000 (JP) .......................................... 2000-141828

(51) Int. Cl.[7] .............................................. B65G 17/00
(52) U.S. Cl. ..................... 198/844.2; 524/495; 524/496; 399/308; 430/126
(58) Field of Search ....................... 198/844.2; 524/495, 524/496; 399/308; 430/126

(56) References Cited

U.S. PATENT DOCUMENTS 6,004,669 A    12/1999    Rokutan et al.

FOREIGN PATENT DOCUMENTS

| JP | 61-95361  | 5/1986 |
| JP | 64-22514  | 1/1989 |
| JP | 3-180309  | 8/1991 |
| JP | 5-77252   | 3/1993 |
| JP | 2560727   | 9/1996 |

Primary Examiner—James J. Seidleck
Assistant Examiner—U. K. Rajguru
(74) Attorney, Agent, or Firm—Oliff & Berridge, PLC

(57) ABSTRACT

The present invention relates to an intermediate transfer member having a polyimide resin film containing oxidized carbon black; and an image forming apparatus comprising an intermediate transfer member having a polyimide resin film containing oxidized carbon black.

13 Claims, 4 Drawing Sheets

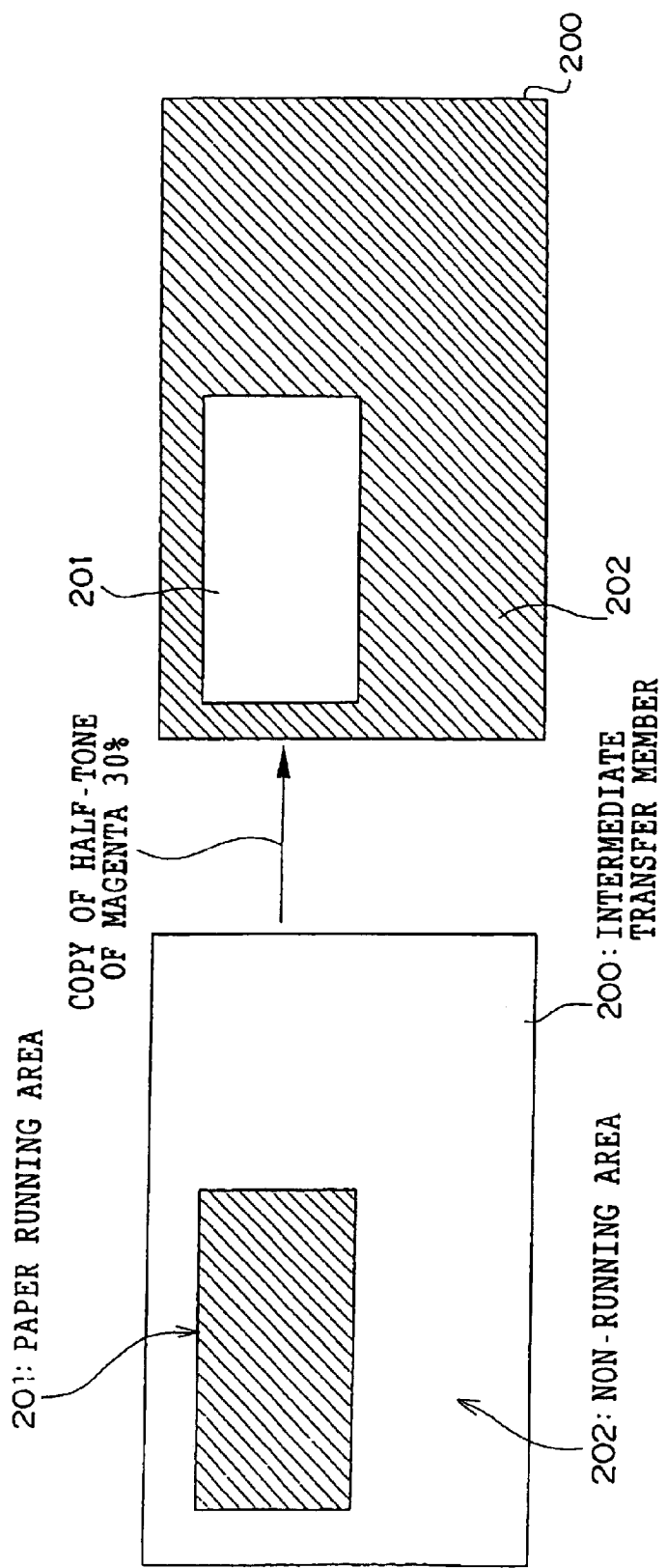

INTERMEDIATE TRANSFER MEMBER AND IMAGE FORMING APPARATUS HAVING THE SAME

This is a division of application Ser. No. 09/721,951 filed Nov. 27, 2000, now U.S. Pat. No. 6,646,040. The entire disclosure of the prior application(s) is hereby incorporated by reference herein in its entirety.

BACKGROUND OF THE INVENTION

1. Field of the Invention

The present invention relates to an intermediate transfer member for use in an image forming apparatus employing an electrophotographic system, such as an electrophotographic copier, a printer, a facsimile, or a device combining these machines, and to an image forming apparatus having the same, and more particularly to an intermediate transfer member used in an image forming apparatus for obtaining a reproduced image by being transferred a toner image formed on a latent image carrier once onto an intermediate transfer member, and the image then being transferred onto paper or another transfer material, and to an image forming apparatus having the same.

2. Description of the Related Art

In an image forming apparatus to which the electrophotographic system is applied, a uniform electric charge is formed on a latent image carrier made of inorganic or organic photoconductive photosensitive material. An electrostatic latent image is formed by a laser with modulated image signals or by light emitting diodes. Thereafter, the electrostatic latent image is developed by charged toner, and a visible toner image is formed. The toner image is then electrostatically transferred onto a transfer material such as a recording paper directly or by way of an intermediate transfer member, so that a desired reproduced image is obtained. In particular, in a known intermediate transfer system, the toner image formed on the image carrier is transferred onto the intermediate transfer member in a primary transfer, and the toner image on the intermediate transfer member is transferred onto the recording paper in a secondary transfer.

The material for the endless belt used in the image forming apparatus employing such an intermediate transfer system is polycarbonate resin (PC), polyvinylidene fluoride (PVDF), polyalkylene phthalate, a blend material of PC and polyalkylene phthalate (PAT), ethylene tetrafluoroethylene copolymer (ETFE), or another thermoplastic resin, and a semiconductive endless belt made therefrom has been proposed.

In Japanese Patent No. 2560727 and Japanese Patent Application Laid-Open (JP-A) No. 5-77252, an ordinary carbon black is dispersed as a conductive fine powder in polyimide resin, and intermediate transfer belts made therefrom are proposed. When ordinary carbon black is dispersed as a conductive fine powder in polyimide resin, variations in electric resistance depending on environmental changes of temperature and humidity are low, but it is difficult to disperse carbon black uniformly, and fluctuations of electric resistance within a plane tend to be larger. Further, since the resistance depends very much on the voltage, in the transfer section, the applied voltage may be concentrated, and the electric resistance may be lowered due to transfer voltage.

In the above-described prior art, in order to obtain a transfer image of high image quality, the electric resistance value of the intermediate transfer member must be controlled to be within a prescribed range, the in-plane fluctuations of the intermediate transfer member (the difference between maximum and minimum values of resistance) must be small, and electric resistance must not change greatly even if the environmental conditions change. In long-term durability tests, a small variation in electric resistance is required for always obtaining a transfer image of high quality.

Also in the prior art, when ordinary carbon black is dispersed in the polyimide resin as a conductive fine powder, secondary aggregation occurs, and a chain of conductivity is likely to be formed, and in-plane fluctuations of electric resistance tend to increase. As a result, due to large in-plane fluctuations of electric resistance, in the transfer section, the applied voltage is concentrated, and the electric resistance is lowered due to applied voltage.

Specifically, for example, in a case of using postcards or similar sheets shorter than the width of the intermediate transfer member, after transferring more than 1000 sheets continuously, when a half-tone (magenta 30%) image was transferred, the paper running area was left in blank. This image defect of blank portions was particularly notable in the low temperature and low humidity environment of 10° C. and 15% RH. Blanking of the paper running area is caused when peeling discharge occurs between the intermediate member and paper when peeling off the paper, due to the applied voltage in the secondary transfer section. The surface resistivity of the paper running area of the intermediate transfer member becomes lower than that of the peripheral area, and the transfer efficiency is lower than that of the peripheral area. It is assumed that, as voltage is applied repeatedly, the carbon black contained in the belt is oxidized, and the conductivity is raised, thereby lowering the resistance.

The decline in resistance tended to be large when the dispersion of the carbon black contained in the belt was poor.

Low resistance leads to shortening of life of the intermediate transfer member, which causes to increase the maintenance labor and running costs, and hence is undesirable.

SUMMARY OF THE INVENTION

It is hence an object of the present invention to provide an intermediate transfer member which has little deformation caused by driving, in which a decline in resistance due to transfer voltage is suppressed, and which has improved uniformity of electric resistance, low dependence on electric field, and few variations in resistance due to the environment, and to provide an image forming apparatus capable of obtaining transfer images of high quality stably for a long period.

Such object is achieved by the following means.

A first aspect of the present invention is an intermediate transfer member having a polyimide resin film containing oxidized carbon black.

A second aspect of the present invention is an image forming apparatus comprising an intermediate transfer member having a polyimide resin film containing oxidized carbon black.

BRIEF DESCRIPTION OF THE DRAWINGS

FIG. 2A and FIG. 2B are schematic diagrams explaining the situation in which blank defect in half-tone occurs.

DESCRIPTION OF THE PREFERRED EMBODIMENTS

The intermediate transfer member and image forming apparatus of the present invention are described in detail below.

Intermediate Transfer Member

An intermediate transfer member of the present invention has a polyimide resin film containing oxidized carbon black.

In the intermediate transfer member of the present invention, the oxidized carbon black as conductive fine powder in the polyimide resin film is less vulnerable to effects of oxidation due to excessive current flowing partially or repeated voltage applications, and high in dispersion in the polyimide resin owing to the effect of oxygen-containing functional group adhering to the surface, and it is also effective to decrease resistance fluctuations and the depending on the electric field is lower, so that concentration of electric field due to transfer voltage hardly occurs. As a result, decline in resistance due to transfer voltage is prevented, uniformity of electric resistance is improved, dependence on electric field is decreased, and changes in resistance due to environments are reduced, and therefore, using this intermediate transfer member, images of high quality suppressed in occurrence of quality defect such as blank defect in the paper running area can be obtained. Moreover, since the polyimide resin film is a material of high Young's modulus, deformation by driving (stress by support roll, cleaning blade, etc.) is smaller, and color deviation and other image defects hardly occur in this intermediate transfer member.

Figure 1:
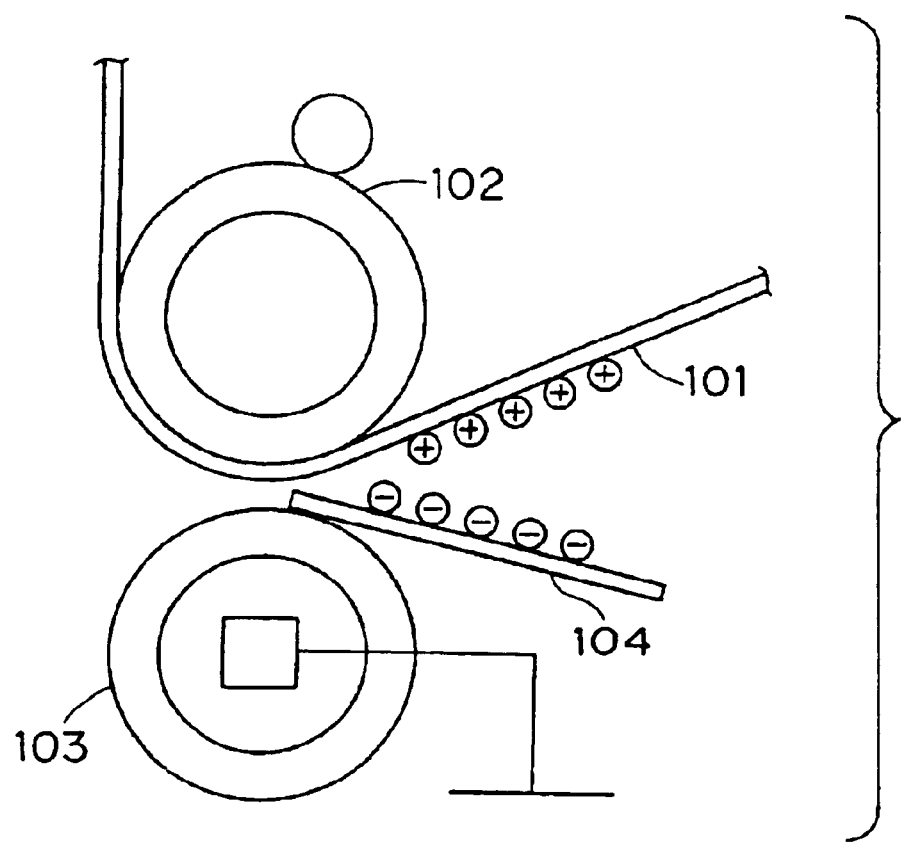
FIG. 1 is a schematic diagram explaining a decline in resistance in a secondary transfer section of an intermediate transfer member.

The mechanism of decline in resistance due to transfer voltage and occurrence of blank defect due to decline in resistance is explained by referring to FIG. 1, FIG. 2A and FIG. 2B.

FIG. 1 is a schematic diagram explaining a decline in resistance in secondary transfer section of the intermediate transfer member. As shown in FIG. 1, paper (transfer material) 104 passes a secondary transfer section (nip) formed of a support roller 102 and a transfer roller 103 by way of an intermediate transfer member 101 in belt form, and a transfer voltage is applied simultaneously to perform secondary transfer. Immediately after secondary transfer, the surface (paper side) of the intermediate transfer member 101 in belt form is charged in the positive polarity, and the surface (intermediate transfer member side) of the paper 104 is charged in the negative polarity, and thereby a peeling discharge occurs between the intermediate transfer member 101 and paper 104. By this discharge phenomenon, the surface of the intermediate transfer member 101 is degenerated, and a new conductive path is formed to lower the resistance. If the dependence on the electric field is high, meanwhile, the electric field is concentrated on the surface of the intermediate transfer member 101, and the surface of the intermediate transfer member 101 is more likely to be degenerated, and the declines in resistance.

FIG. 2A is a schematic diagram explaining the situation in which blank defect in half-tone occurs. As shown in FIG. 2A, after consecutive 1000 copies (in the low temperature and low humidity environment of, for example, 10° C. and 15% RH), the decline in resistance as shown in FIG. 1 occurs in a paper running area 201 of an intermediate transfer member 200. In this state, when half-tone of magenta 30% is copied, it is hardly printed in the paper running area 201 in which the resistance is lower than in non-running area 202 (FIG. 2B). As a result, a blank defect occurs. This blank defect is more likely to occur when the surface resistivity of the paper running area 201 is lower than that of the non-running area 202 by 1.1 order (log Ω/□) or more.

The polyimide resin film can be obtained by using a polyimide precursor, and adding imide after forming a film (layer). This is explained in detail below.

As the polyimide precursor, polyamic acid obtained by polymerization reaction of tetracarboxylic dianhydride or a derivative thereof, and diamine in solvent is preferably used. The polyamic acid is obtained by reaction of nearly equal moles of tetracarboxylic dianhydride or a derivative thereof, and diamine in organic solvent, and it is usually used in a solution.

An example of tetracarboxylic dianhydride is expressed in general formula (1) below.

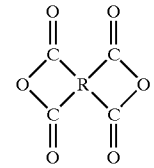

General formula (1)

where R represents a quadrivalent organic group selected from an aromatic group, aliphatic group, alicyclic group, and combination of aromatic group and aliphatic group. Said quadrivalent organic group may be substituted with at least one substituent.

Specific examples of tetracarboxylic dianhydride include pyromellitic acid dianhydride (PMDA), 3,3',4,4'-benzophenone tetracarboxylic dianhydride, 3,3',4,4'-biphenyl tetracarboxylic dianhydride (BPDA), 2,3,3,4-biphenyl tetracarboxylic dianhydride, 2,3,6,7-naphthalene tetracarboxylic dianhydride, 1,4,5,8-naphthalene tetracarboxylic dianhydride, 2,2'-bis(3,4-dicarboxyphenyl)propane dianhydride, bis(3,4-dicarboxyphenyl)sulfonic dianhydride, perylene-3,4,9,10-tetracarboxylic dianhydride, bis(3,4-dicarboxyphenol)ether dianhydride, and ethylene tetracarboxylic dianhydride.

Specific examples of diamine include 4,4'-diaminophenyl ether (DDE), 4,4'-diaminodiphenyl methane, 3,3'-diaminodiphenyl methane, 3,3'-dichlorobenzidine, 4,4'-diaminodiphenyl sulfide, 3'-diaminodiphenyl sulfone, 1,5-diaminonaphthalene, m-phenylene diamine, p-phenylene diamine (PDA), 3,3'-dimethyl-4,4'-biphenyl diamine, benzidine, 3,3'-dimethyl benzidine, 3,3'-dimethoxy benzidine, 4,4'-diaminophenyl sulfone, 4,4'-diaminodiphenyl propane, 2,4-bis(β-amino-tertiary butyl) toluene, bis(p-β-amino-tertiary butyl phenol)ether, bis(p-β-methyl-amino phenyl benzene)benzene, bis-p-(1,1-dimethyl-5-amino-pentyl)benzene, 1-isopropyl-2,4-m-phenylene diamine, m-xylylene diamine, p-xylylene diamine, di(p-aminocyclohexyl)methane, hexamethylene diamine, heptamethylene diamine, octamethylene diamine, nonamethylene diamine, decamethylene diamine, diamino-propyl tetramethylene, 3-methyl heptamethylene diamine, 4,4-dimethylheptamethylene diamine, 2,11-diaminododecane, 1,2-bis-3-aminopropoxy ethane, 2,2-dimethyl propylene diamine, 3-methoxyhexamethylene diamine, 2,5-dimethylheptamethylene diamine, 3-methyl heptamethylene diamine, 5-methyl nonamethylene diamine, 2,17-diamino eicosadecane, 1,4-diaminocyclohexane, 1,10-diamino-1,10-dimethyl decane, 12-diamino octadecane, 2,2-bis[4-(4-aminophenone)phenyl]propane, piperazine, $H_2N(CH_2)_3O(CH_2)_2O(CH_2)NH_2$, $H_2N(CH_2)_3S(CH_2)_3NH_2$, and $H_2N(CH_2)_3N(CH_3)_2(CH_2)_3NH_2$.

As the solvent to be used for polymerization reaction between tetracarboxylic dianhydride and diamine, a polar solvent is preferably used from the view point of solubility. As the polar solvent, N,N-dialkyl amides are preferred, and specifically materials of lower molecular weight are used, such as N,N-dimethyl formamide and N,N-dimethyl acetamide.

The solvent may be easily removed from the polyamic acid or polyamic acid product by evaporation, substitute or diffusion. Other examples of polar solvent include N,N-diethyl formamide, N,N-diethyl acetamide, N,N-dimethyl methoxy acetamide, dimethyl sulfoxide, hexamethyl phosphortriamide, N-methyl-2-pyrrolidone, pyridine, dimethyl sulfoxide, tetramethylene sulfone, and dimethyl tetramethylene sulfone. They may be used either alone or in combination of a plurality.

The polar solvent may be also used together with cresol, phenol, xylenol, other phenols, benzanitrile, dioxane, butyrolactone, xylene, cyclohexane, hexane, benzene, toluene, etc. They may be used either alone or in combination of a plurality.

The polyamic acid is obtained by reaction of tetracarboxylic dianhydride (a) and diamine (b) in a solvent. At this time, the monomer concentration (the concentration of (a+b) in the solvent) is set according to various conditions, and it is preferably 5 to 30 wt. %. The reaction temperature can be preferably set at 80° C. or less, and more preferably 5 to 50° C., and the reaction time is 5 to 10 hours. Incidentally, since the polyamic acid is likely to be hydrolyzed and lowered in molecular weight in the presence of moisture, and it is preferred to perform synthesis of polyamic acid in a substantially anhydrous state.

When the polyamic acid obtained by reaction of tetracarboxylic dianhydride and diamine in solvent is formed into imide a polyimide resin film is obtained. The imide is formed by heating the product at a temperature enough for inducing imide forming reaction, and the reaction temperature is, for example, about 250 to 400° C. depending on the type of the polyimide resin. The structure of the obtained polyimide resin is determined almost by the monomer composition.

The polyimide resin film is preferred to contain repetition units having biphenyl skeleton therein by 50 mol % or more, and preferably 80 mol % or more. The polyimide resin having such biphenyl skeleton can be obtained by using 3,3',4,4'-biphenyl tetracarboxylic dianhydride or a derivative thereof as the monomer.

The oxidized carbon black is obtained by oxidizing carbon black, and adding oxygen-containing functional group (for example, carboxyl group, quinone group, lactone group, hydroxyl group, etc.) to the surface. Oxidation is realized, for example, by an air oxidation method of contact reaction with air in high temperature atmosphere, a reaction method of nitrogen oxide or ozone at ordinary temperature, or a method of oxidation by ozone at low temperature after air oxidation at high temperature.

The conductivity of oxidized carbon black is preferred to be 15 or less at least by one index. As the oxidized carbon black, by using carbon black of high resistance with conductivity index of 15 or less, the uniformity of electric resistance and environmental stability are improved more effectively, and the decline of surface resistivity can be lowered in long-term use.

The conductivity index of oxidized carbon black is the value expressed in formula (1) below, and shows the degree of conductivity. The smaller the conductivity index, the higher is the resistance of carbon black. Generally, when carbon black is oxidized, the functional group is oxidized, and the volatile matter increases, and the conductivity index tends to be smaller. Thus, by properly selecting the factors in formula (1), the conductivity index can be adjusted. In formula (1), the specific surface area ($m^2/g$) is the value calculated by the BET method using nitrogen adsorption. DBP oil absorption (cc/100 g) indicates the amount of dibutyl phthalate (DBP) observed in 100 g of carbon black. The DBP oil absorption is value which is defined by ASTM (American Standard Testing Method) D2414-6T. Volatile matter (%) is the value calculated by the rate of organic volatile matter (oxygen-containing functional group, for example, carboxyl group, quinone group, lactone group, hydroxyl group, etc.) coming out when the oxidized carbon black is heated for 7 minutes at 950° C.

$$\text{Conductivity index} = (\text{specific surface area} \times \text{DBP oil absorption})^{1/2} / (1 + \text{volatile matter}) \quad \text{Formula (1)}$$

Specific examples of oxidized carbon black include SPECIAL BLACK 4 (Degussa, specific surface area: 180 $m^2/g$, DBP oil absorption: 280 cc/100 g, volatile matter: 14.0%, conductivity index: 15.0), SPECIAL BLACK 250 (Degussa, specific surface area: 40 $m^2/g$, DBP oil absorption: 48 cc/100 g, volatile matter: 2.0%, conductivity index: 14.6), and BLACK PEARLS L (Cabbot, specific surface area: 138 $m^2/g$, DBP oil absorption: 55 cc/100 g, volatile matter: 5.0%, conductivity index: 15.0).

The content of the oxidized carbon black is preferably about 10 to 50 wt. % of the polyimide resin, and more preferably 12 to 30 wt. %. If the content is less than 10 wt. %, the uniformity of electric resistance is lowered and the decline of surface resistivity in long-term use may increase. On the other hand, when exceeding 50 wt. %, it is hard to obtain desired resistance, and it may be difficult to form polyimide resin film.

The method of mixing and dispersing oxidized carbon black uniformly in the polyimide resin is not particularly limited, and may include, among others, a method of mixing and dispersing in the polyamic acid solution which is the polyimide precursor by means of planetary mixer, beads mill, three rolls mill or the like, and a method of dispersing carbon black into the solvent to be used in synthesis process of polyamic acid by using ball mill or ultrasonic waves, and synthesizing polyamic acid by using this solvent. At this time, a dispersant may be used for enhancing the affinity of carbon black and solvent. Examples of such dispersant include poly(N-vinyl-2-pyrrolidone), poly(N,N'-diethyl acrylazide), poly(N-vinyl formamide), poly(N-vinyl, acetamide), poly(N-vinyl phthalamide), poly(N-vinyl succinic amide), poly(N-vinyl urea), poly(N-vinyl piperidone), poly(N-vinyl caprolactam), and poly(N-vinyl oxazolidone).

The polyimide resin film may contain, aside from the oxidized carbon, other additives such as silicone or fluorine organic compound, coupling agent, lubricant, and antioxidant, so far as the properties may not be spoiled. Also other polymer components may be copolymerized or blended in the polyimide resin film, so far as the properties may not be spoiled.

The surface resistivity of the intermediate transfer member of the present invention is preferred to be $1 \times 10^{10}$ to $1 \times 10^{14}$ Ω/□, and more preferably $1 \times 10^{11}$ to $1 \times 10^{13}$ Ω/□. If the surface resistivity is higher than $10^{14}$ Ω/□, peeling discharge is likely to occur in the post-nip section for peeling the image carrier of the primary transfer section and the intermediate transfer member, and the discharge portion may have an image defect of blank. On the other hand, if less than $10^{10}$ Ω/□, the electric field intensity is strong in the pre-nip section, and gap discharge is likely to occur in the pre-nip section, which causes a problem of granular poor image quality. Therefore, by controlling the surface resistivity within the specified range, problems of blank due to discharge occurring when the surface resistivity is high, and poor image quality occurring when the surface resistivity is low can be prevented. Herein, the surface resistivity denotes the surface resistivity on the transfer plane.

Figure 3A:
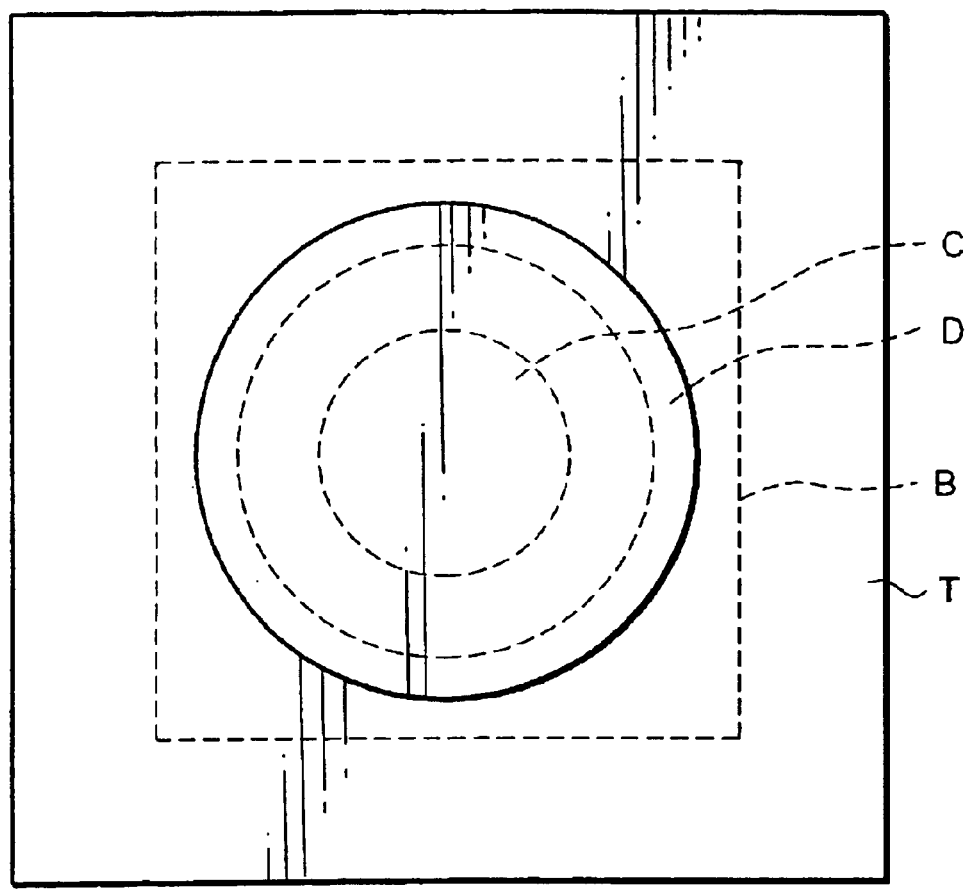
FIG. 3A is a schematic plan view showing an example of a circular electrode for measuring surface resistivity.
Figure 3B:
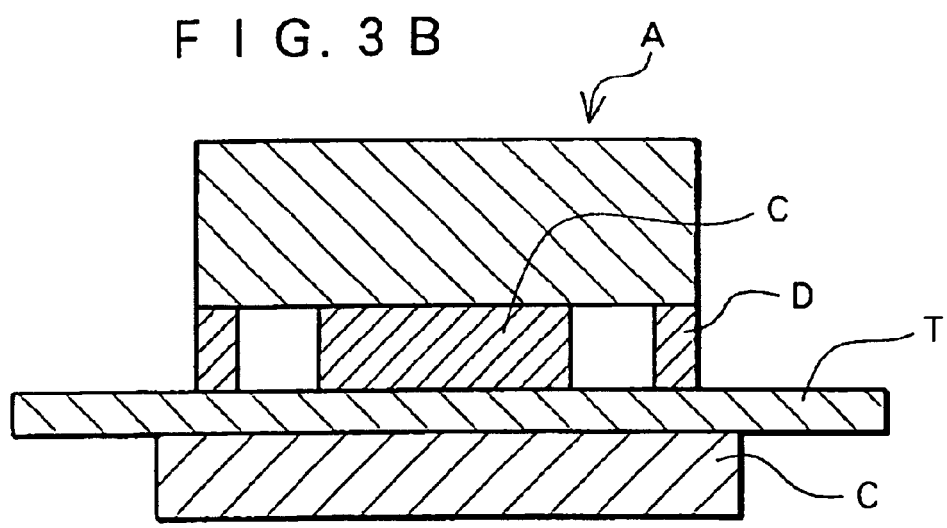
FIG. 3B is a schematic sectional view of the circular electrode shown in FIG. 3A.

In the intermediate transfer member of the present invention, the surface resistivity can be measured according to JIS K 6991, by using a circular electrode (for example, HR probe of Hirester IP of Mitsubishi Yuka). Specifically, for example, it can be measured by using the circular electrode shown in FIG. 3A and FIG. 3B. FIG. 3A is a schematic plan showing an example of a circular electrode for measuring surface resistivity, and FIG. 3B is its schematic sectional view. The circular electrode shown in FIG. 3A and FIG. 3B comprises a first voltage application electrode A and a plate insulator B. The first voltage application electrode A has a columnar electrode C, and a cylindrical ring-form electrode D having an inside diameter larger than the outside diameter of the columnar electrode C and surrounding the columnar electrode C at a specific spacing. Holding an intermediate transfer member T between the columnar electrode C and ring-form electrode D of the first voltage application electrode A and the plate insulator B, when the voltage (V) is applied between the columnar electrode C and ring-form electrode D in the first voltage application electrode A, the flowing current I (A) is measured, and the surface resistivity ρs (Ω/□) of the intermediate transfer member T can be calculated according to the following formula (2). Herein, in formula (2), d (mm) denotes the outside diameter of the columnar electrode C. D (mm) indicates the inside diameter of the ring-form electrode D.

$$\rho s = \pi \times (D+d)/(D \cdot d) \times (V/I) \qquad \text{Formula (2)}$$

The dependence on the electric field of the surface resistivity of the material which constitutes a transfer surface of the intermediate transfer member in the present invention is preferred to be 0.6 order (log Ω/□) or less, and more preferably 0.5 order (log Ω/□) or less. When the dependence on electric field of the surface resistivity is 0.6 order (log Ω/□) or less, the concentration of the electric field due to transfer voltage hardly occurs. Accordingly, the surface resistivity of the paper running area declines, and occurrence of the quality defect such as blank defect in the paper running area is prevented on the half-tone image.

In the intermediate transfer member of the present invention, the dependence on the electric field of the surface resistivity shows the differences between the common logarithmic values of the surface resistivity under the conditions of the applied voltage of 100 V (the electric field intensity 143V/cm) and the applied voltage of 1000 V (the electric field intensity 1429V/cm). In addition, the surface resistivity can be measured according to the measuring method mentioned above.

In the intermediate transfer member of the present invention, the difference of the common logarithmic value (log Ω/□) of the surface resistivities at 28° C. 85% RH and 10° C. 15% RH is preferred to be 1.0 order (log Ω/□) or less, and more preferably 0.5 order (log Ω/□) or less. By using the oxidized carbon black of electronic conductive type, the difference of the common logarithmic value of the surface resistivity in the environments of 28° C. 85% RH and 10° C. 15% RH can be limited within 1.0 order, and the environmental resistance in the ion conductive type can be improved. The surface resistivity is the value in the condition of applied voltage of 100 V, and it can be measured according to the measuring method mentioned above.

The intermediate transfer member of the present invention may be either belt form or drum form, but the belt form is preferred from the viewpoint of freedom of disposition of other sub-systems and ease of handling. The intermediate transfer member of the present invention, in the case of belt form, consists of an elastic layer of a single layer or plural layers, and at least as one of elastic layers, a polyimide resin film containing oxidized carbon black is used. In the case of drum form, on the other hand, an elastic layer of a single layer or plural layers is formed on the substrate, and at least as one of elastic layers, a polyimide resin film containing oxidized carbon black is used. A surface coat layer may be formed on the elastic layer. In the intermediate transfer member of the present invention, aside from the composition of using a polyimide resin film containing oxidized carbon black at least as one of elastic layers, the other composition such as layer composition and type of substrate belongs to the known art.

In the case of belt form, the intermediate transfer member of the present invention is preferred to be an endless belt, and more preferably a seamless belt. The seamless belt is hitherto known, and it can be formed, for example, by forming a polyimide resin film on a tubular core, and peeling if off the tubular core. To form the polyimide resin film on the tubular core, for example, the material liquid is developed on the inner and outer circumference of the tubular core into a tubular form by coating according to the immersion method, heating and centrifugal forming method or applying method, and the developed layer is dried and formed into a film. The detail is specifically described in, for example, JP-A No. 61-95361, JP-A No. 62-22514, and JP-A No. 3-180309. When forming the seamless belt, further, proper process may be executed, such as releasing process and defoaming process of the core.

When using other endless belt than seamless belt as the intermediate transfer member of the present invention, for example, after forming a long sheet of polyimide resin film in a continuous process according to the above method, it is cut to a specified length, and both ends are adhered by a common known method.

The thickness of the intermediate transfer member of the present invention is determined properly depending on the purpose in the case of belt form, but generally considering from the mechanical characteristics such as strength and flexibility, it is preferred to be in a range of about 20 to 500 μm, and more preferably 50 to 200 μm.

The intermediate transfer member of the present invention is used in an image forming apparatus comprising a first transfer device for transferring the toner image formed on the image carrier onto the intermediate transfer member by primary transfer, and a second transfer device for transferring the toner image transferred onto the intermediate transfer member onto the transfer material by secondary transfer. As the intermediate transfer member of the present invention, in the case of belt form, a transfer conveying belt may be used for conveying the transfer material into the transfer region for transferring the toner image on the transfer material.

Image Forming Apparatus

The image forming apparatus of the present invention comprises the intermediate transfer member of the present invention mentioned above. The image forming apparatus of the present invention is an image forming apparatus of intermediate transfer system comprising a first transfer unit for transferring the toner image formed on the image carrier onto the intermediate transfer member by primary transfer, and a second transfer unit for transferring the toner image transferred on the intermediate transfer member onto the transfer material by secondary transfer, in which the intermediate transfer member is the intermediate transfer member of the present invention. Also in the image forming apparatus, the intermediate transfer member of the present invention may be provided as a transfer conveying belt for conveying the transfer material in the transfer region for transferring the toner image onto the transfer material. Having the intermediate transfer member of the present invention, transfer images of high quality are obtained stably for a long period.

The image forming apparatus of the present invention is not particularly limited as far as it is an image forming apparatus of intermediate transfer type, and examples include an ordinary monochromatic image forming apparatus accommodating only a monochromatic color in the developing device, a color image forming apparatus for repeating primary transfer of the toner image carried on the image carrier sequentially on the intermediate transfer member, and a tandem color image forming apparatus having plural image carriers having developing units of each color disposed in series on the intermediate transfer member. More specifically it may arbitrarily comprise an image carrier, a charging unit for uniformly charging the surface of the image carrier, an exposure unit for exposing the surface of the intermediate transfer member and forming an electrostatic latent image, a developing unit for developing the latent image formed on the surface of the image carrier by using a developing solution and forming a toner image, a fixing unit for fixing the toner unit on the transfer material, a cleaning unit for removing toner and foreign matter sticking to the image carrier, a destaticizing unit for removing the electrostatic latent image left over on the surface of the image carrier, and others by known methods as required.

As the image carrier, a known one may be used. As its photosensitive layer, organic system, amorphous silicon, or other known material may be used. In the case of the image carrier of cylindrical type, it is obtained by a known method of molding aluminum or aluminum alloy by extrusion, and processing the surface. A belt form image carrier may also used.

The charging unit is not particularly limited, and known chargers may be used, such as contact type charger using conductive or semiconductive roller, brush, film and rubber blade, scolotron charger or colotron charge making use of corona discharge, and others. Above all, the contact type charging unit is preferred from the viewpoint of excellent, charge compensation capability. The charging unit usually applies DC current to the electrophotographic photosensitive material, but AC current may be further superposed.

The exposure unit is not particularly limited, and, for example, an optical system device may be used, which exposes a desired image on the surface of the electrophotographic photosensitive material by using a light source such as semiconductor laser beam, LED beam, liquid crystal shutter beam or the like, or through a polygonal mirror from such light source.

The developing unit may be properly selected depending on the purpose, and, for example, a known developing unit for developing by using one-pack type developing solution or two-pack type developing solution, with or without contact, using brush and roller may be used.

The first transfer unit includes known transfer chargers such as contact type transfer charger using belt, roller, film and rubber blade, and scolotron transfer charger or colotron transfer charger making use of corona discharge. Above all, the contact type transfer charger is preferred from the viewpoint of excellent transfer charge compensation capability. In the present invention, aside from the transfer charger, a peeling type charger may be also used together.

The second transfer unit may be same as the first transfer unit such as contact type transfer charger using transfer roller and others, scolotron transfer charger and colotron transfer charger. Same as in the first transfer unit, the contact type transfer charger is preferred. By pressing firmly by the transfer roller of the contact type transfer charger, the image transfer stage can be maintained in a favorable state. Further, by pressing the transfer roller or the contact type transfer charger at the position of the roller for guiding the intermediate transfer member, the action of moving the toner image from the intermediate transfer member to the transfer material may be done in a favorable state.

As the photo destaticizing unit, for example, tungsten lamp or LED may be used, and the light quality used in the photo destaticizing process may include white light of tungsten lamp and red light of LED. As the irradiation light intensity in the photo destaticizing process, usually, the output is set to be about several times to 30 times of the quantity of light showing the half exposure sensitivity of the electrophotographic photosensitive material.

The fixing unit is not particularly limited, and any known fixing unit may be used, such as heat roller fixing unit and oven fixing unit.

The cleaning unit is not particularly limited, and any known cleaning device may be used.

Figure 4:
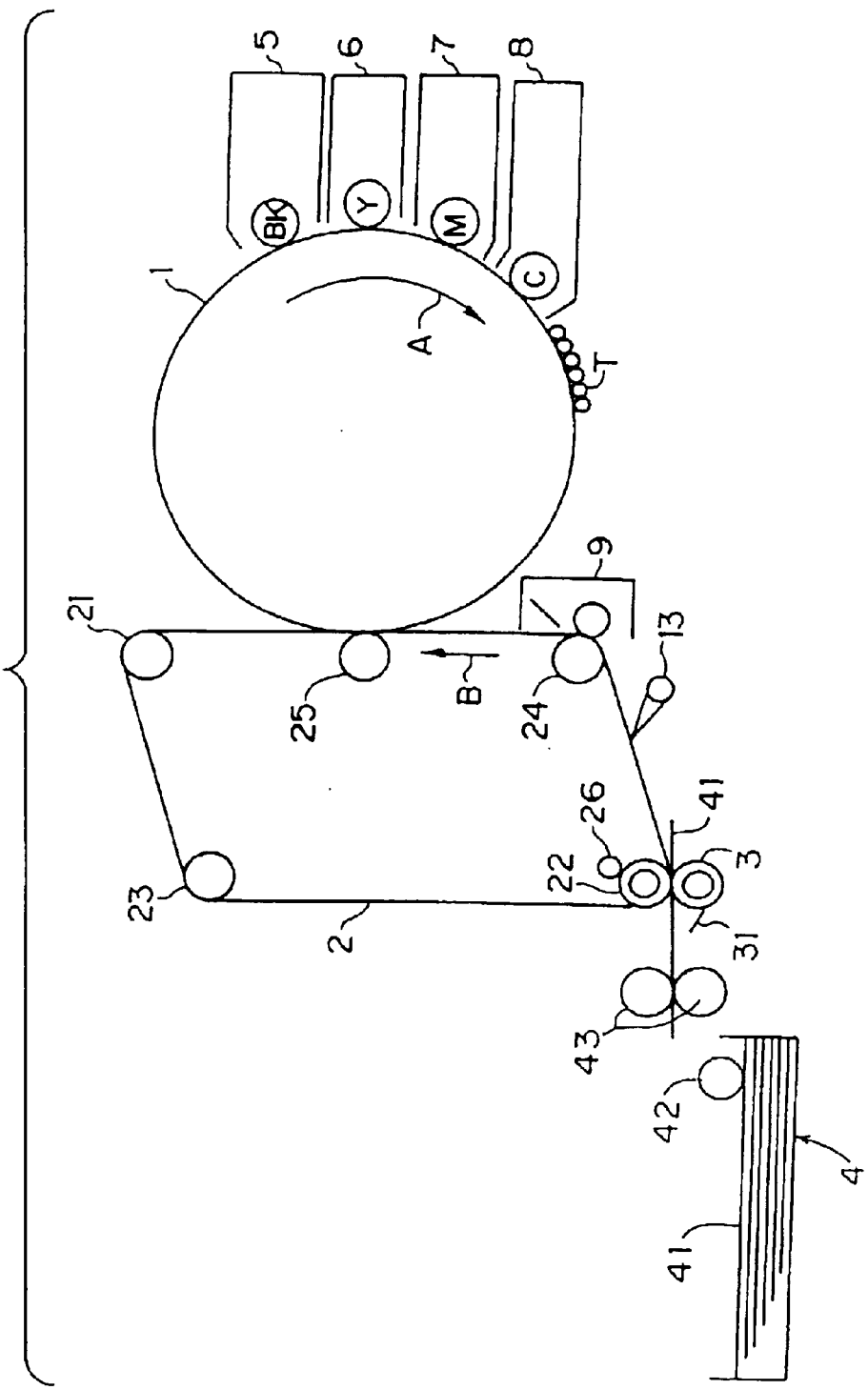
FIG. 4 is a schematic structural view showing an example of an image forming apparatus of the present invention.

As an example of the image forming apparatus of the present invention, a color image forming apparatus for repeating primary transfer is shown. FIG. 4 is a schematic structural diagram showing an example of the image forming apparatus of the present invention.

The image forming apparatus shown in FIG. 4 comprises a photosensitive drum 1 as image carrier, a transfer belt 2 as intermediate transfer member, a bias roller 3 as transfer electrode, a tray 4 for feeding paper as transfer material, a developing device 5 by B (black) toner, a developing device 6 by Y (yellow) toner, a developing device 7 by M (magenta) toner, a developing device 8 by C (cyan) toner, a belt cleaner 9, a peeling pawl 13, belt rollers 21, 23 and 24, a backup roller 22, a conductive roller 25, an electrode roller 26, a cleaning blade 31, a paper block 41, a pickup roller 42, and a feed roller 43.

In the image forming apparatus shown in FIG. 4, the photosensitive drum 1 rotates in the direction of arrow A, and the surface of the charging device not shown is uniformly charged. On the charged photosensitive drum 1, an electrostatic latent image of a first color (for example, B) is formed by an image writing device such as laser writing device. This electrostatic latent image is developed by toner by the developing device 5, and a visible toner image T is formed. The toner image T is brought to the primary transfer unit comprising the conductive roller by rotation of the photosensitive drum 1, and an electric field of reverse polarity is applied to the toner image T from the conductive roller 25, and the toner image T is electrostatically adsorbed on the transfer belt 2, and the primary transfer is executed by rotation of the transfer belt 2 in the direction of arrow B.

Similarly, a toner image of second color, a toner image of third color and a toner image of fourth color are sequentially formed, and overlaid on the transfer belt 2, and a multi-layer toner image is formed.

The multi-layer toner image transferred on the transfer belt 2 is brought to the secondary transfer unit comprising the bias roller 3 by rotation of the transfer belt. The secondary transfer unit comprises the bias roller 3 disposed at the surface side of carrying the toner image of the transfer belt 2, backup roller 22 disposed to face the bias roller from the back side of the transfer belt 2, and electrode roller 26 rotating in tight contact with the backup roller 22.

The paper 41 is taken out one by one from the paper block accommodated in the paper tray 4 by means of the pickup roller 42, and is fed into the space between the transfer belt 2 and bias roller 3 of the secondary transfer unit by means of the feed roller 43 at a specified timing. The fed paper 41 is conveyed under pressure between the bias roller 3 and backup roller 22, and the toner image carried on the transfer belt 2 is transferred thereon by rotation of the transfer belt 2.

The paper 41 on which the toner image is transferred peeled off from the transfer belt 2 by operating the peeling pawl 13 at the retreat position until the end of primary transfer of the final toner image, and conveyed to the fixing device not shown, and the toner image is fixed by pressing and heating, and a permanent image is formed. After transfer of the multi-layer toner image onto the paper 41, the transfer belt 2 is cleaned by the belt cleaner 9 disposed at the downstream side of the secondary transfer unit to remove the residual toner, and is ready for next transfer. The bias roller 3 is provided so that the cleaning blade 31 made of polyurethane or the like may be always in contact, and toner particles, paper dust and other foreign matter sticking by transfer are removed.

In the case of transfer of monochromatic image, the toner image T after primary transfer is immediately sent to the secondary transfer process, and is conveyed to the fixing device, but in the case of transfer of multi-color image by combination of plural colors, the rotation of the transfer belt 2 and photosensitive drum 1 is synchronized so that the toner images of plural colors may coincide exactly in the primary transfer unit, and deviation of toner images of colors is prevented. In the secondary transfer unit, by applying a voltage of same polarity (transfer voltage) as the polarity of the toner to the electrode roller 26 tightly contacting with the backup roller 22 disposed oppositely through the bias roller 3 and transfer belt 2, the toner image is transferred onto the paper 41 by electrostatic repulsion.

Thus, the image is formed.

EXAMPLES

Embodiments of the present invention are described below, but it must be noted that the present invention is not limited to these examples alone whatsoever.

Example 1

In N-methyl-2-pyrrolidone (NMP), a specified amount of dried carbon black (SPECIAL BLACK 4, Degussa, specific surface area: 180 $m^2/g$, DBP oil absorption: 280 cc/100 g, volatile matter: 14.0%, conductivity index: 15.0) was mixed in a ball mill for 6 hours at room temperature. In this carbon black dispersed NMP solution, 294.2 g of 3,3',4,4'-biphenyl tetracarboxylic dianhydride (BPDA) and 108.2 g of p-phenylene diamine (PDA) were dissolved to perform reaction while stirring for 4 hours at room temperature in nitrogen atmosphere, and a polyamic acid solution containing carbon black was obtained.

The polyamic acid solution containing carbon black was applied on the inner surface of the cylindrical die (core) by using a bullet form running element so as to be uniform in thickness, and dried for 30 minutes by blowing hot air at 60° C., then heated for 60 minutes at 150° C., and further heated to 200° C. at temperature rise rate of 2° C./minute, and kept at 200° C. for 30 minutes and returned to room temperature, and a semicured film was obtained.

After removing the semicured film from the die, it was put on the outside of the cylindrical die, and heated from 200 to 400° C. at temperature rise rate of 5° C./minute, and after removing the dehydrating and ring closing water, and transforming into imide, it was returned to room temperature, and peeled off from the die, and an endless polyimide belt containing carbon black (14 wt. % in polyimide) of 80 μm in thickness was obtained.

Example 2

An endless polyimide belt was obtained in the same manner as in example 1 except that the composition of the polyimide resin and type and amount of carbon black (CB) in example 1 were changed as follows.

As the polyimide resin, a copolymer of acid component (BPDA) and amine component (PDA/DDE=8/2) was used.

As the carbon black, a mixture of SPECIAL BLACK 4 and SPECIAL BLACK 250 (Degussa, specific surface area: 40 $m^2/g$, DBP oil absorption: 48 cc/100 g, volatile matter: 2.0%, conductivity index: 14.6) was used (23 wt. % in the polyimide, consisting of 14 wt. % of SPECIAL BLACK 4 and 9% of SPECIAL BLACK 250).

Comparative Example 1

An endless polyimide belt was obtained in the same manner as in example 1 except that the type and amount of carbon black in example 1 were changed as follows.

As the carbon black, MA100 (Mitsubishi Chemical, specific surface area: 114 $m^2/g$, DBP oil absorption: 100 cc/100 g, volatile matter: 1.5%, conductivity index: 43) was used by 22 wt. % in the polyimide.

Comparative Example 2

An endless polyimide belt was obtained in the same manner as in example 1 except that the type and amount of carbon black in example 1 were changed as follows.

As the carbon black, #3050B (Mitsubishi Chemical, specific surface area: 43 $m^2/g$, DBP oil absorption: 176 cc/100 g, volatile matter: 0.53%, conductivity index: 47) was used by 25 wt. % in the polyimide.

Evaluation

In the endless polyimide belts obtained in examples 1 and 2 and comparative examples 1 and 2, the surface resistivity, in-plane fluctuations of surface resistivity, environmental variation width of surface resistivity, and dependence on the electric field of the surface resistivity were investigated. Further, using the endless polyimide belt as the transfer belt 2, it was mounted on the image forming apparatus shown in FIG. 4, and after continuous copies of 30000 (30 k) of postcards (sheets), the lowering amount of surface resistivity of the paper running area and occurrence of blank by copying of magenta 30% half-tone were investigated. The results are shown in Table 1.

Each item was measured as follows.

Surface Resistivity

In the embodiments, the surface resistivity was measured by using a circular electrode shown in FIG. 3A and FIG. 3B (HR probe of Hirester IP of Mitsubishi Yuka, outside diameter of columnar electrode C: 16 m, inside diameter of ring-form electrode D: Φ 30 mm, its outside diameter: Φ 40 mm), applying voltage of 100 V in the environment of 22° C. and 55% RH, determining the current value 10 seconds later, and calculating as mentioned above.

Environmental Fluctuation Width of Surface Resistivity

The resistance fluctuation width in the embodiments was calculated as the logarithmic difference of the surface resistivity between the high temperature and high humidity (H/H) environment (28° C., 85% RH) and low temperature and low humidity (L/L) environment (10° C., 15% RH).

In-plane Fluctuation of Surface Resistivity

To determine the in-plane fluctuation (ΔR) of surface resistivity in the embodiments, the endless polyimide belt was divided into 8 sections in the peripheral directions and 3 sections in the width direction, and the surface resistivity was measured at 24 points in the belt plane, and the logarithmic values of the surface resistivity, and the difference of the maximum value and minimum value was calculated.

Dependence on Electric Field of the Surface Resistivity

In the measurement of the surface resistivity shown in FIG. 3A and FIG. 3B, the dependence on the electric field of the surface resistivity is the difference between the common logarithmic values of the surface resistivity at the applied voltage of 100V and at the applied voltage of 1000V.

Decline of Surface Resistivity After 30000 (30 k) Continuous Copies

In the embodiments, the decline of surface resistivity after 30000 continuous copies was calculated as the difference in the logarithmic value between the initial surface resistivity and the surface resistivity in the paper running area after 30000 (30 k) continuous copies.

As clear from Table 1, the endless polyimide belts of examples 1 and 2 had the surface resistivity within a range of $10^{10}$ to $10^{14}$ (Ω/□), and the in-plane fluctuation of surface resistivity, environmental variation width of surface resistivity and decline of surface resistivity in paper running area after 30000 continuous copies were within 1 order (log Ω/□), and favorable images were obtained, and they were sufficiently practicable. On the other hand, the endless polyimide belt of comparative example 1 had the surface resistivity within a range of $10^{10}$ to $10^{14}$ (Ω/□), and the in-plane fluctuation of surface resistivity and environmental variation width of surface resistivity were small, and the results were favorable, but the decline of surface resistivity in paper running area after 30000 continuous copies was larger than in the surrounding, and blank problems occurred, and it was far from practical use. Further, the endless polyimide belt of comparative example 2 had the surface resistivity within a range of $10^{10}$ to $10^{14}$ (Ω/□), and the environmental variation width of surface resistivity was small and favorable, but the in-plane fluctuation of the surface resistivity was large, and the decline of surface resistivity in paper running area after 30000 continuous copies was larger than in the surrounding, and blank problems occurred, and it was far from practical use.

It is thus known that the endless polyimide belts in examples 1 and 2 are low in the decline in belt resistance due to transfer voltage, and free from problems such as belt deformation in the course of time, and therefore it is not necessary to replace the intermediate transfer member frequently, and it is known that transfer images of high quality can be stably obtained for a long period.

What is claimed is:

1. A transfer conveying belt for conveying a transfer material into a transfer region for transferring a toner image on the transfer material, the transfer conveying belt having a polyimide resin film containing oxidized carbon black.

2. The transfer conveying belt of claim 1, wherein at least one type of the oxidized carbon black has a conductivity index of 15 or less.

TABLE 1

|  | Example 1 | Example 2 | Comparative Example 1 | Comparative Example 2 |
|---|---|---|---|---|
| Polyimide resin composition | (BPDA/PDA) | (BPDA/PDA):(BPDA/DDE) = 8:2 | (BPDA/PDA) | (BPDA/PDA) |
| Type of CB (conductivity index) | SB4(15.0) | SB4(15.0) + SB250(14.6) | MA100(43.0) | #3050B(47) |
| Content of CB (wt. %) | 14 | 23 | 22 | 25 |
| Surface resistivity (log Ω/□) | 11.1 | 10.4 | 11.5 | 11.3 |
| Fluctuation of surface resistivity (log Ω/□) | 0.9 | 0.6 | 0.7 | 1.5 |
| Environmental variation width of surface resistivity (log Ω/□) | 0.12 | 0.22 | 0.10 | 0.13 |
| Decline of surface resistivity after 30k copies (order) | 0.10 | 0.07 | 3.6 | 6 |
| Dependence on electric field of surface resistivity (log Ω/□) | 0.6 | 0.5 | 1.2 | 1.6 |

CB: Carbon black
SB4: SPECIAL BLACK 4
SB250: SPECIAL BLACK 250

3. The transfer conveying belt of claim 1, wherein the surface resistivity is in a range of $10^{10}$ to $10^{14}$ ($\Omega/\square$).

4. The transfer conveying belt of claim 1, wherein the difference in the common logarithmic values (log $\Omega/\square$) of the surface resistivities at 28° C., 85% RH and 10° C., 15% RH is within 1.0 order (log $\Omega/\square$).

5. The transfer conveying belt of claim 1, wherein dependence of an electric field of the surface resistivity is within 0.6 order (log $\Omega/\square$).

6. The transfer conveying belt of claim 1, wherein the intermediate transfer member has a seamless form.

7. The transfer conveying belt of claim 1, wherein the oxidized carbon black has an oxygen-containing functional group on the surface of the carbon black.

8. The transfer conveying belt of claim 7, wherein the oxygen-containing functional group is at least one type selected from the group consisting of carboxyl group, quinone group, lactone group, and hydroxyl group.

9. The transfer conveying belt of claim 1, wherein the content of the oxidized carbon black is 10 to 50 wt. % in the polyimide resin.

10. The transfer conveying belt of claim 1, wherein the content of the oxidized carbon black is 12 to 30 wt. % in the polyimide resin.

11. The transfer conveying belt of claim 1, wherein one of monomer components of the polyimide resin is tetracarboxylic dianhydride expressed by the following formula (1),

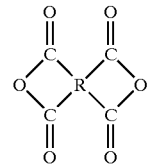

General formula (1)

where R represents a quadrivalent organic group selected from an aromatic group, aliphatic group, alicyclic group, and combination of aromatic group and aliphatic group, and said quadrivalent organic group may be substituted with at least one substituent.

12. The transfer conveying belt of claim 11, wherein the tetracarboxylic dianhydride expressed by formula (1) is 3,3',4,4'-biphenyl tetracarboxylic dianhydride or a derivative thereof.

13. An image forming apparatus comprising a transfer conveying belt for conveying a transfer material into a transfer region for transferring a toner image on the transfer material, the transfer conveying belt having a polyimide resin film containing oxidized carbon black.

* * * * *